June 9, 1925.
E. H. HOSTERMAN ET AL
1,541,501
MACHINE FOR CUTTING VEGETABLES AND THE LIKE
Filed Dec. 17, 1923     2 Sheets-Sheet 1
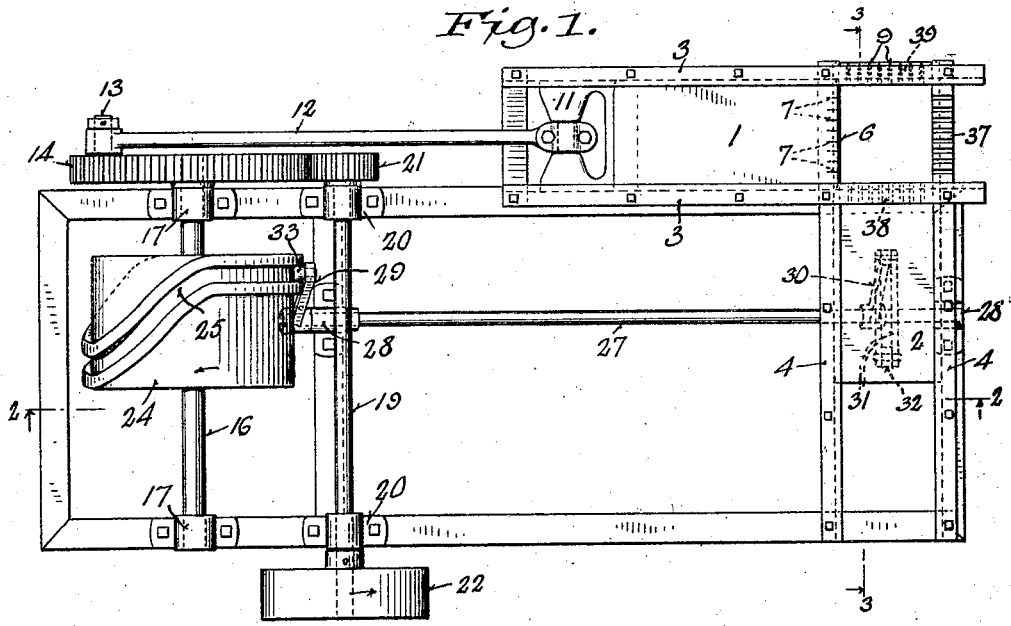
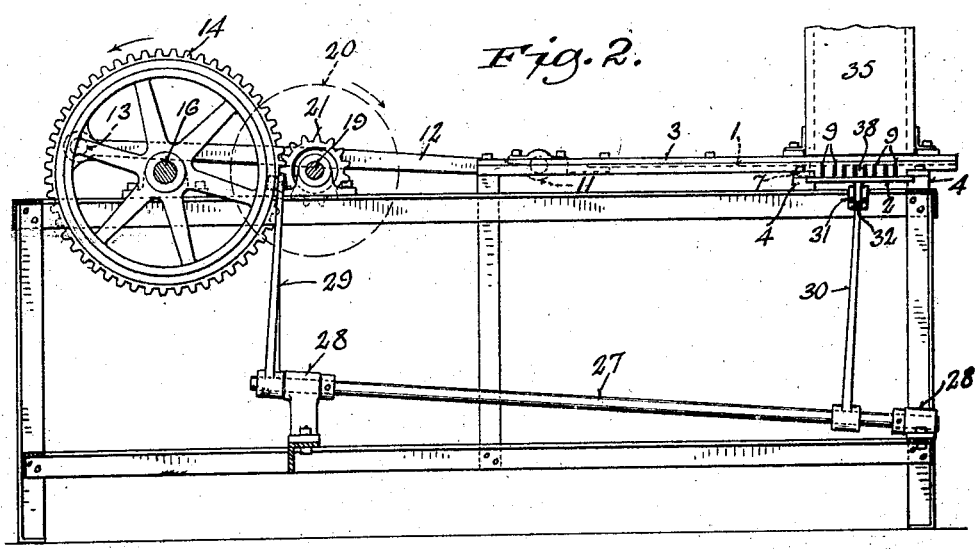
INVENTORS
Ernest H. Hosterman,
BY William Dorn,
Bottum, Hudnall, Lecher & McNamara,
ATTORNEYS.

June 9, 1925.  
E. H. HOSTERMAN ET AL  
1,541,501  
MACHINE FOR CUTTING VEGETABLES AND THE LIKE  
Filed Dec. 17, 1923  
2 Sheets-Sheet 2
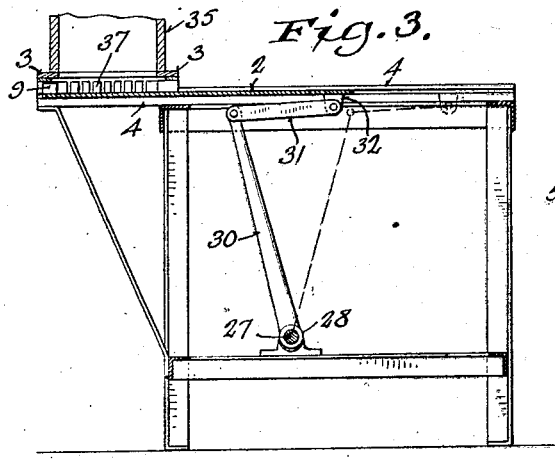
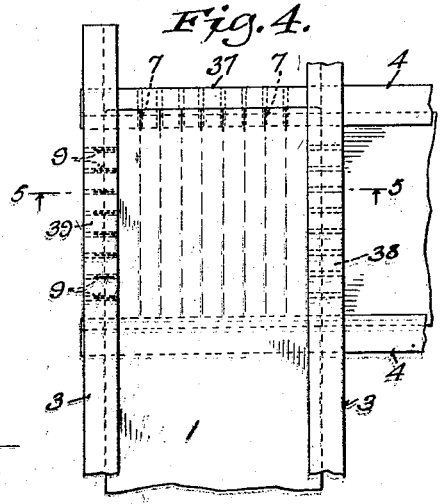
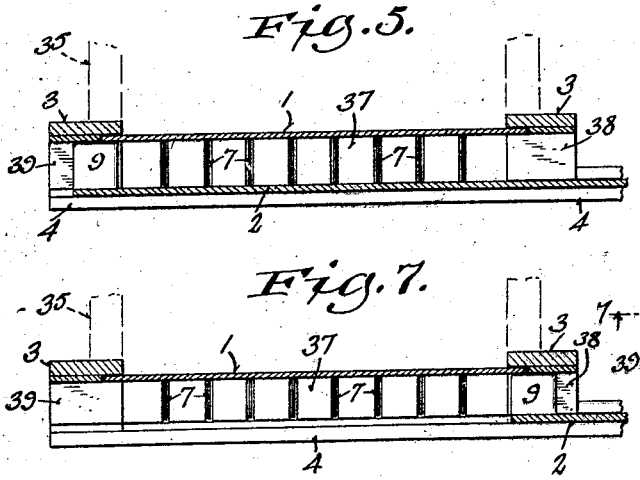
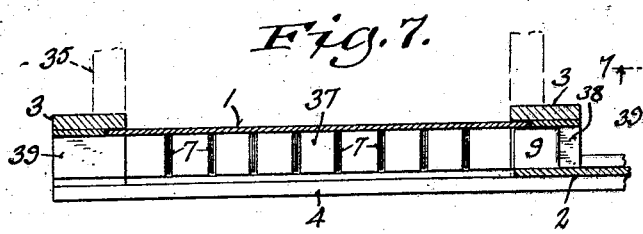
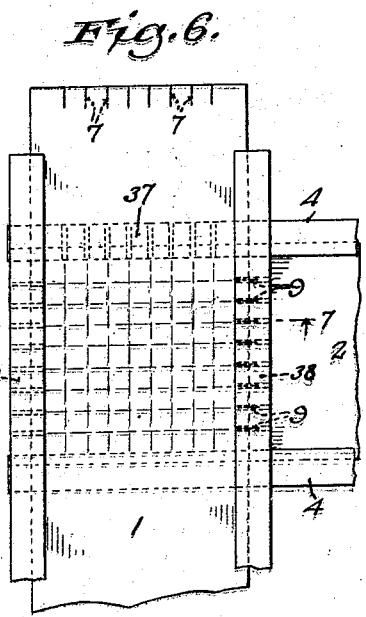

Patented June 9, 1925.

UNITED STATES PATENT OFFICE.

ERNEST H. HOSTERMAN AND WILLIAM DORN, OF HARTFORD, WISCONSIN.

MACHINE FOR CUTTING VEGETABLES AND THE LIKE.

Application filed December 17, 1923. Serial No. 681,089.

*To all whom it may concern:*

Be it known that we, ERNEST H. HOSTERMAN and WILLIAM DORN, citizens of the United States, residing at Hartford, in the county of Washington and State of Wisconsin, have invented certain new and useful Improvements in Machines for Cutting Vegetables and the like, of which the following is a specification, reference being had to the accompanying drawing, forming a part thereof.

This invention relates to machines for dicing or for cutting vegetables and the like into cubes or small pieces suitable for canning or other purposes.

Its main objects are to facilitate dicing or cutting vegetables or the like, such as beets, into cubes or pieces suitable for canning or other purposes; to provide simple and easily operated mechanism for this purpose; and generally to simplify and improve the construction and operation of machines of this class.

It consists in the construction, arrangement and combination of parts as hereinafter particularly described and pointed out in the claims.

In the accompanying drawing like characters designate the same parts in the several figures.

Figure 1 is a plan view of a machine embodying the invention; Fig. 2 is a longitudinal section thereof on the line 2—2, of Fig. 1; Fig. 3 is a cross section on the line 3—3, Fig. 1; Fig. 4 is an enlarged plan view of the reciprocating blades or plates and their guideways, showing the upper blade partially advanced and the lower blade at the limit of its advance movement; Fig. 5 is an enlarged vertical section on the line 5—5, Fig. 4; Fig. 6 is a plan view similar to Fig. 4, showing the upper blade at the limit of its advance movement and the lower blade at the limit of its backward movement; and Fig. 7 is an enlarged vertical section, similar to Fig. 5, on the line 7—7, Fig. 6.

The machine comprises two reciprocating blades or plates 1 and 2, guided and movable transversely to each other in parallel horizontal planes one above the other, in ways 3 and 4, mounted on the frame of the machine. The paths of the blades 1 and 2 intersect or cross each other adjacent one end thereof.

The upper blade or plate 1, which may be made of steel, is provided with a transverse cutting edge 6 at one end, which may be designated as the leading end, and is provided adjacent and transversely thereto with downwardly extending parallel knives 7.

The lower blade or plate 2, which is located at one end of the machine and is movable transversely to and underneath the path of the blade or plate 1, is provided at its leading end and transversely thereto with upwardly extending parallel knives 9, arranged transversely to the knives 7 and like said knives, corresponding in vertical length with the distance between the planes of the blades or plates.

At its trailing end the blade 1 is attached to a cross head 11, which is guided in the ways 3 and is connected by a rod 12 with a crank pin 13 on a gear 14. The gear 14 is fixed on the adjacent end of a transverse shaft 16, which is mounted in bearings 17 on the machine frame. The gear and crank wheel 14 is rotated and the blade 1 is reciprocated by a driving shaft 19, mounted in bearings 20 on the frame of the machine parallel with the shaft 16, and provided with a pinion 21 meshing with said gear. The shaft 19 may be provided with a pulley 22, as shown in Fig. 1, for operating the machine by power, or it may be provided with a crank for operating it by hand.

A cam 24 is fixed on the shaft 16 and is provided on its periphery with a groove 25. A longitudinal rocker shaft 27, mounted in bearings 28 on cross members of the frame, is provided at or adjacent its ends with upwardly extending arms 29 and 30. The arm 30 is connected at its upper end by a double link 31 with a depending ear 32 on the under side of the blade or plate 2. The arm 29 is provided at its upper end with a pin carrying a roller 33, which engages the groove 25 in the cam 24. Above the crossing of the paths of the blades 1 and 2, a hopper, spout or feed box 35 is mounted for holding vegetables or the like on the blades or plates 1 and 2 in position to be sliced, slit and cut by the edge 6 and knives 7 of the blade 1, and by the knives 9 of the blade 2, into cubes or pieces of the desired size for canning or other purposes.

On three sides of the opening at the lower end of the hopper 35, transversely notched or slotted bars or barriers 37, 38 and 39 are formed or mounted on the ways 3 and 4 for confining the vegetables or material to be cut on the plates 1 and 2 below the hopper, and to provide abutments against which the vegetables are held as they are sliced, slit and cut into pieces by the edge 6 of the blade 1 and the knives 7 and 9. The notches or slits in the barriers 37, 38 and 39 are spaced to correspond with the spacing of the knives 7 and 9, and thus permit the knives of each blade to pass through or into the barriers clear of the path of the knives of the other blade.

In the operation of the machine, the hopper or feed box 35 being supplied with vegetables or the like, assuming that the blades or plates 1 and 2 are in the positions in which they are illustrated in Figs. 1, 2 and 3, and the crank and cam are being rotated in the direction indicated by arrows, the blade or plate 1 is advanced over the blade or plate 2, and its cutting edge 6 and knives 7 slice and slit strips from the under side of the vegetables or the like supported on the blade 2, as indicated by dotted lines in Fig. 4.

With about a quarter of a revolution of the crank pin 13, the knives 7 on the upper blade or plate 1 pass into the notches or slots in the barrier 37 and clear the path of the knives 9 on the blade or plate 2, which, during such movement of the upper plate, dwells in its advanced position. The roller 33 on the arm 29 of the rocker shaft 27 now enters the offset portion of the groove 25 in the cam 24, which by its continued rotation withdraws the lower blade or plate 2 from the position in which it is shown in Figs. 1, 3, 4 and 5, into the position in which it is shown in Figs. 6 and 7, thereby causing the knives 9 to cut the strips which have been cut by the blade 1 and its knives 7 and are resting on the blade or plate 2, crosswise into cubes or pieces of the desired size, as indicated by dotted lines in Fig. 6, the cubes or pieces when severed from one another falling over the retreating end of the blade 2 into a receptacle (not shown) below.

At the limit of the backward movement of the blade or plate 2, the knives 9 pass into the notches or slots in the barrier 38 and clear the path of the knives 7.

While the blade or plate 2 is being withdrawn as above explained, the upper blade or plate 1 is advanced by the continued movement of the crank pin 13 into the position in which it is shown in Fig. 6. The lower blade or plate 2 is then advanced by the cam 24 underneath the blade or plate 1, which now supports the vegetables or the like in the hopper, till the lower blade or plate reaches the limit of its advance movement, as shown in Fig. 4. During the advance of the lower blade or plate 2 the upper blade or plate 1 is withdrawn to about the position in which it is shown in Fig. 4, and then by the continued movement of the crank pin 13, is withdrawn to its initial position shown in Fig. 1, allowing the vegetables or the like in the hopper to drop upon the blade or plate 2, whereupon the operations above described are repeated.

The crank pin 13 is so arranged and the cam 24 so constructed and set on the shaft 16 relative to the crank pin, that the blade or plate 2 will be advanced and withdrawn, while the blade or plate 1 is above it in position to support the vegetables or the like in the hopper 35, and while the cam makes about a half revolution. During the other half revolution of the cam, while the straight portion of the groove 25 engages the roller 33, the lower blade or plate 2 dwells at the limit of its advance movement in position to support the vegetables or the like in the hopper while the upper blade or plate 1 is withdrawn and advanced during about a half revolution of the crank pin 13, to allow the vegetables or the like in the hopper to drop upon the lower blade or plate on which they are supported while strips are cut therefrom by the advance of the upper blade or plate.

Various changes in the construction and arrangement of parts of the machine may be made without departure from the principle and scope of the invention as defined in the following claims.

We claim:

1. In a machine for cutting vegetables and the like, the combination of two reciprocating plates guided and movable transversely to each other in parallel planes one above the other, the upper plate provided at one end with a cutting edge and adjacent and transversely thereto with downwardly extending parallel knives, and the lower plate provided adjacent one end with upwardly extending knives arranged transversely to the knives of the upper plate, and mechanism adapted to reciprocate the upper plate and to advance and withdraw the lower plate while the upper plate is over it in position to support the material to be cut.

2. In a machine for cutting vegetables and the like, the combination of two reciprocating plates guided and movable transversely to each other in parallel planes one above the other, the upper plate provided at one end with a cutting edge and adjacent and transversely thereto with downward extending parallel knives and the lower plate provided adjacent one end with upwardly extending knives arranged transversely to the knives of the upper plate, a hopper located over the crossing of the paths of the plates, and mechanism adapted to reciprocate the upper plate and to advance and withdraw the lower plate while the upper plate is over it and underneath the hopper.

3. In a machine for cutting vegetables and the like, the combination of two reciprocating plates guided and movable transversely to each other in parallel planes one above the other, the upper plate provided at one end with a cutting edge and adjacent and transversely thereto with downwardly extending knives and the lower plate provided adjacent one end with upwardly extending knives arranged transversely to the knives of the upper plate, a crank connected with the upper plate and a cam connected with the lower plate and adapted to advance and withdrew it while the upper plate is passing over it at the crossing of the path of the two plates.

4. In a machine for cutting vegetables and the like, the combination of two reciprocating plates guided and movable transversely to each other in parallel planes one above the other and in paths which cross each other, the upper plate provided at one end with a cutting edge and adjacent and transversely thereto with downwardly extending knives and the lower plate provided adjacent one end with upwardly extending knives arranged transversely to the knives of the upper plate, a hopper located over the crossing of the paths of the plates, and a shaft provided with a crank and a cam connected with the upper and the lower plates respectively and adapted to advance and withdraw the upper plate underneath the hopper once to each revolution of the shaft and to advance and withdraw the lower plate underneath the upper plate during a part of each revolution of the shaft while the upper plate is underneath the hopper.

5. In a machine for cutting vegetables and the like, the combination of two reciprocating plates guided and movable transversely to each other in parallel planes one above the other and in paths which cross each other, the upper plate provided at one end with a cutting edge and adjacent and transversely thereto with downwardly extending knives and the lower plate provided adjacent one end with upwardly extending knives arranged transversely to the knives of the upper plate, a hopper located over the crossing of the paths of the plates, a transverse shaft provided with a crank connected with the upper plate, a cam mounted on said shaft, and a longitudinal rocker shaft having an arm connected by a link with the lower plate and an arm engaging the cam which is adapted to advance and withdraw the lower plate underneath the upper plate while it is below the hopper and to cause the lower plate to dwell in its advanced position during a part of each revolution of the crank and cam.

6. In a machine for cutting vegetables and the like, the combination of two reciprocating plates guided and movable transversely to each other in parallel planes one above the other and in paths which cross each other, the upper plate, provided at one end with a transverse cutting edge and adjacent and transversely thereto with downwardly extending knives and the lower plate provided adjacent one end with upwardly extending knives arranged transversely to the knives of the upper plate, a hopper located over the crossing of the paths of the plates, mechanism adapted to reciprocate said plates, and barriers located on adjacent sides of the hopper towards which the knives move in cutting and slotted to permit the passage of the knives.

7. In a machine of the character described, the combination with a frame, a hopper associated therewith, and a pair of blade members slidably mounted in said frame in different horizontal planes for movement across the bottom of said hopper, of mechanism adapted to actuate said blade members whereby the latter are in position alternately to provide a closure at all times for the bottom of said hopper.

8. In a machine of the character described, the combination with a frame, a hopper associated therewith, and a pair of blade members slidably mounted in said frame in different horizontal planes for movement across the bottom of said hopper, of mechanism adapted to actuate said blade members whereby the latter are in position alternately to provide a closure at all times for the bottom of said hopper, said means comprising a cam associated with one of said members, a plurality of gears associated with the other of said members, and a drive shaft common to and connected with said cam and said gears.

9. In a machine for cutting vegetables and the like, the combination of two reciprocating plates guided and movable transversely to each other in parallel planes one above the other and in paths which cross each other, the upper plate provided at one end with a cutting edge and adjacent and transversely thereto with downwardly extending knives and the lower plate provided adjacent one end with upwardly extending knives arranged transversely to the knives of the upper plate, a hopper located over the crossing of the paths of the plates, and mechanism adapted to actuate said plates whereby the latter are in position alternately to provide a closure at all times for the bottom of said hopper.

In witness whereof we hereto affix our signatures.

ERNEST H. HOSTERMAN.
WILLIAM DORN.